(12) United States Patent
Fransdonk

(10) Patent No.: US 7,415,440 B1
(45) Date of Patent: Aug. 19, 2008

(54) METHOD AND SYSTEM TO PROVIDE SECURE KEY SELECTION USING A SECURE DEVICE IN A WATERCRYPTING ENVIRONMENT

(75) Inventor: Robert Fransdonk, Vista, CA (US)

(73) Assignee: Entriq, Inc., Carlsbad, CA (US)

( * ) Notice: Subject to any disclaimer, the term of this patent is extended or adjusted under 35 U.S.C. 154(b) by 812 days.

(21) Appl. No.: 10/082,498

(22) Filed: Feb. 22, 2002

(51) Int. Cl.
G06F 17/60 (2006.01)

(52) U.S. Cl. ............................ 705/59; 705/1; 705/50; 705/51; 705/55; 380/4

(58) Field of Classification Search ............ 705/59, 705/1, 50, 51, 55; 380/4
See application file for complete search history.

(56) References Cited

U.S. PATENT DOCUMENTS

| | | |
|---|---|---|
| 5,111,504 A | 5/1992 | Esserman et al. |
| 5,613,004 A | 3/1997 | Cooperman et al. |
| 5,636,292 A | 6/1997 | Rhoads |
| 5,659,726 A | 8/1997 | Standford et al. |
| 5,664,018 A | 9/1997 | Leighton |
| 5,687,191 A | 11/1997 | Lee et al. |
| 5,687,236 A | 11/1997 | Moskowitz et al. |
| 5,710,834 A | 1/1998 | Rhoads |
| 5,734,752 A | 3/1998 | Knox |
| 5,745,569 A | 4/1998 | Moskowitz et al. |
| 5,745,604 A | 4/1998 | Rhoads |
| 5,748,763 A | 5/1998 | Rhoads |
| 5,748,783 A | 5/1998 | Rhoads |
| 5,768,426 A | 6/1998 | Rhoads |
| 5,790,664 A * | 8/1998 | Coley et al. ............... 709/203 |
| 5,799,086 A * | 8/1998 | Sudia ......................... 705/76 |
| 5,809,139 A | 9/1998 | Girod et al. |
| 5,870,474 A | 2/1999 | Wasilewski et al. |
| 5,905,800 A | 5/1999 | Moskowitz et al. |
| 5,915,027 A | 6/1999 | Cox et al. |
| 5,982,891 A | 11/1999 | Ginter et al. |
| 5,991,426 A | 11/1999 | Cox et al. |

(Continued)

FOREIGN PATENT DOCUMENTS

WO WO-0004713 A1 1/2000

OTHER PUBLICATIONS

Davis, W. L., et al., "Issues in the Design of a Key Distribution Centre—NPL Reportes DNACS 43-81", *NPL report DITC, National Physical Laboratory, Division of Numerical Analysis and Computer Science*, ISSN 0143-7348,(Apr. 1981),1-22.

(Continued)

*Primary Examiner*—Andrew J. Fischer
*Assistant Examiner*—John Winter
(74) *Attorney, Agent, or Firm*—Schwegman, Lundberg & Woessner, P.A.

(57) ABSTRACT

A method and system are disclosed to provide secure key selection using a secure device in a watercrypting environment. A license containing a product key of a watercrypted content and a client identifier is transmitted to a secure device for storage. An entitlement control message containing multiple content keys associated with the watercrypted content is further transmitted to the secure device, together with a request to provide a session content key from the multiple content keys, the session content key to be used to decrypt the watercrypted content. Finally, the session content key is received from the secure device in response to the request.

42 Claims, 5 Drawing Sheets

U.S. PATENT DOCUMENTS

| | | | |
|---|---|---|---|
| 5,999,629 | A | 12/1999 | Heer et al. |
| 6,002,772 | A | 12/1999 | Saito |
| 6,037,984 | A | 3/2000 | Isnardi et al. |
| 6,044,471 | A * | 3/2000 | Colvin .................. 726/28 |
| 6,141,530 | A | 10/2000 | Rabowsky |
| 6,169,976 | B1 * | 1/2001 | Colosso .................. 705/59 |
| 6,208,745 | B1 | 3/2001 | Florencio et al. |
| 6,209,094 | B1 | 3/2001 | Levine et al. |
| 6,332,194 | B1 | 12/2001 | Bloom et al. |
| 6,343,280 | B2 * | 1/2002 | Clark .................. 705/55 |
| 6,363,149 | B1 | 3/2002 | Candelore |
| 6,425,081 | B1 | 7/2002 | Iwamura |
| 6,564,253 | B1 * | 5/2003 | Stebbings .................. 709/217 |
| 6,742,121 | B1 | 5/2004 | Safadi |
| 7,002,974 | B1 | 2/2006 | Deerman et al. |
| 2001/0051996 | A1 * | 12/2001 | Cooper et al. .................. 709/217 |
| 2002/0026581 | A1 * | 2/2002 | Matsuyama et al. .......... 713/168 |
| 2002/0044658 | A1 | 4/2002 | Wasilewski et al. |
| 2002/0087970 | A1 | 7/2002 | Dorricott et al. |
| 2003/0009669 | A1 | 1/2003 | White et al. |
| 2003/0138127 | A1 | 7/2003 | Miller et al. |
| 2004/0068541 | A1 | 4/2004 | Bayassi et al. |
| 2005/0259813 | A1 | 11/2005 | Wasilewski et al. |
| 2006/0013435 | A1 | 1/2006 | Rhoads |
| 2006/0041512 | A1 | 2/2006 | Stefik |

OTHER PUBLICATIONS

EBU Project Group B/CA, "Functional model of a conditional access system", *EBU Technical Review*, 266, Grand-Saconnex, CH,(Winter 1995),64-77.

Lennon, R. E., et al., "Cryptographic Key Distribution for Terminal to Terminal Communication", *IBM Technical Disclosure Bulletin*, vol. 2, (Jul. 1979),636-639.

Matthews, James R., "PCT Search Report", *PCT Search Report*, (Jul. 10, 2003),4 pages.

Merkle, Ralph C., "Protocols for Public Key Cryptosystems", *1980 IEEE Symposium on Security and Privacy*, (Apr. 14-16, 1980), 122-134.

Scheiner, Bruce , "Chapter 3—Applied cryptography : protocols, algorithms, and source code in C", *New York : Wiley, Second Edition*, (1996),47-74.

Schneier, Bruce , "Chapter 2—Applied Cryptography: protocols, algorithms, and source code in C", *New York : Wiley, Second Edition*, (1996),21-46.

Van Rijnsoever, B J., et al., "Interoperable Content Protection for Digital TV", *Philips Research*, Prof. Holstlaan 4, Eindhoven, The Netherlands, Copyright 2000 IEEE,4 pages.

Wayner, Peter , "Watermarking May Hold Key To Sharing Copyrighted Material", *Interactive Week Special To Interactive Week*, (Jan. 29, 2001),5 pages.

Rijnsoever, et al., Interoperable Content Protection for Digital TV, HTML Paper, 2000, 4 pages.

Scneier, Basic Protocols, Applied Cryptography, Second edition, Oct. 18, 1995, Chapter 3, pp. 47-74.

Scneier, Protocol Building Blocks, Applied Cryptography, Second edition, Oct. 18, 1995, Chapter 2, pp. 21-46.

Functional model of a conditional access system, EBU Technical Review, 1995 Winter, No. 266, pp. 64-77.

Merkle, et al., Protocols for Public Key Cryptosystems, 1980 IEEE, p. 122-134.

Price, et al., Issues in the Design of Key Distribution Centre, National Physical Laboratory, NPL Reports, Apr. 1981.

Lennon, et al., Cryptographic Key Distribution for Terminal Communications, IBM Technical Disclosure Bulletin vol. 22 No. 2, Jul. 1979, pp. 636-639.

Wayner, Watermarking May Hold Key to Sharing Copyrighted Material, Interactive Week, Jan. 29, 2001.

PCT Search Report, PCT/US01/07206, Jun. 5, 2001, 9 pages.

PCT Search Report, PCT/US01/19271, Nov. 16, 2001, 10 pages.

PCT Search Report, PCT/US01/29031, Dec. 27, 2001, 8 pages.

* cited by examiner

METHOD AND SYSTEM TO PROVIDE SECURE KEY SELECTION USING A SECURE DEVICE IN A WATERCRYPTING ENVIRONMENT

RELATED APPLICATIONS

This patent application is related to U.S. patent application Ser. No. 10/082,424, entitled "Method and System to Provide Secure Key Distribution in a Watercrypting Environment," and filed concurrently herewith.

FIELD OF THE INVENTION

The present invention relates generally to content distribution in a network environment. More particularly, the present invention relates to the secure distribution of content. Specifically, the present invention relates to a method and system to provide secure key selection using a secure device in a watercrypting environment and to a secure manner to embed a unique fingerprint in the content in order to track unauthorized distribution of the content.

BACKGROUND OF THE INVENTION

Digital content distribution has increased tremendously with the emergence of Wide Area Networks ("WANs") such as the Internet. For example, users on the Internet can request streaming video content using a video-on-demand type of service. A number of challenges exist, however, for distributing content to users via the Internet. One challenge is preventing illegal copying and distribution of premium content.

Network operators use a number of content protection systems to prevent illegal copying and distribution of content. One type of content protection system is a conditional access (CA) system. A CA system imposes restrictions and rules for accessing distributed content. For example, a CA system may control access to content by encrypting the content before distribution and sending decryption keys for users to decrypt the encrypted content. A CA system typically uses entitlement control messages ("ECMs") to deliver the decryption keys to the users. An ECM is a message that includes decryption keys to decrypt encrypted content and rules and requirements to access the decryption keys. In many current CA systems the same encrypted content is broadcasted to multiple users along with its corresponding ECM on the same network. A disadvantage of current CA systems is that the same encrypted content and decryption keys are distributed to all users. Thus, for current CA systems, there is no secure means to create unique content copies for each user.

Therefore, what is needed is a secure method to deliver ECMs such that authorized users only receive ECMs containing the right decryption keys for decrypting the right piece of content, thereby creating a unique sequence for each user. Further, what is needed is a secure environment and method to select an appropriate session decryption key from the decryption keys delivered within the ECMs in order to decrypt the desired content.

SUMMARY OF THE INVENTION

A method and system are disclosed to provide secure key selection using a secure device in a watercrypting environment. According to one aspect of the present invention, a license containing a product key of a watercrypted content and a client identifier is transmitted to a secure device for storage. An entitlement control message containing multiple content keys associated with the watercrypted content is further transmitted to the secure device, together with a request to provide a session content key from the multiple content keys, the session content key to be used to decrypt the watercrypted content. Finally, the session content key is received from the secure device in response to the request.

Other features and advantages of the present invention will be apparent from the accompanying drawings, and from the detailed description, which follows below.

BRIEF DESCRIPTION OF THE DRAWINGS

The present invention is illustrated by way of example, and not limitation, by the figures of the accompanying drawings in which like references indicate similar elements in which.

DETAILED DESCRIPTION

A method and system are described to provide secure key selection using a secure device in a watercrypting environment. For one embodiment, a license containing a content identifier of a watercrypted content and a client identifier is transmitted to a secure device for storage. An entitlement control message containing multiple content keys associated with the watercrypted content is further transmitted to the secure device, together with a request to provide a session content key from the multiple content keys, the session content key to be used to decrypt the watercrypted content. Finally, the session content key is received from the secure device in response to the request.

The following embodiments describe secure key distribution and selection in a watercrypting environment such that a client is able to access or decrypt the right piece of watercrypted content. In particular, the following embodiments describe enforcement of a watercrypting process by cryptographically binding unique keys with unique watermark or fingerprint information. In the following description, a "watermark" or "watermark identifier" refers to a fingerprint, identifier, or signature that may be used to indicate copyright protected content. The watermark can also be used to indicate the origin and authenticity of the content or the identity of clients/users/customers of the content.

In the following description, "watercrypting" or "watercrypt" refer to the process of duplicating content and adding a first watermark identifier to a first piece of duplicated content and a second watermark identifier to a second piece of duplicated content for distribution to a client. Watercrypting also refers to the process of encrypting the duplicated content with unique keys and generating ECMs to distribute securely the unique keys such that unique keys are tied to unique watermark identifiers.

Furthermore, in the following description, for purposes of explanation, numerous specific details are set forth in order to provide a thorough understanding of the present invention. It will be evident, however, to one skilled in the art that the present invention may be practiced without these specific details.

Figure 1:
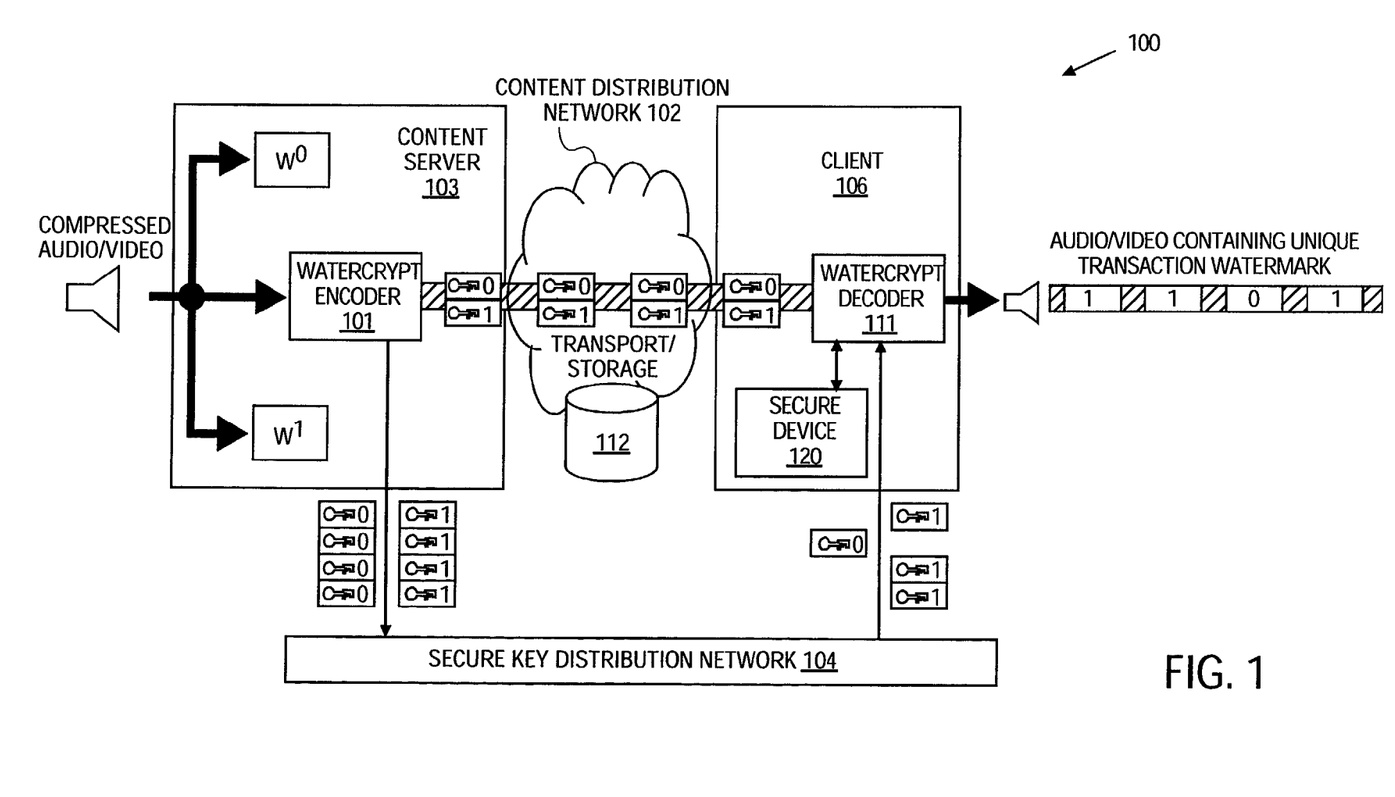
FIG. 1 is a block diagram of one embodiment of a watercrypting environment to provide secure key distribution and selection.

FIG. 1 is a block diagram of one embodiment of a watercrypting environment to provide secure key distribution and selection. Secure key distribution is implemented by a watercrypting process that cryptographically binds unique keys with unique watermark or fingerprint information.

Referring to FIG. 1, content server 103 performs a watercrypting process in network environment 100 to create watercrypted content. Content server 103 also distributes watercrypted content to client 106 via content distribution network 102. Content server 103 can also distribute keys to client 106 via secure key distribution network 104. In one embodiment, content server 103 generates entitlement control messages ("ECMs") to deliver the keys to client 106. In the following embodiments, such ECMs are messages that include encrypted keys tied to unique segments of watercrypted content. Client 106 receives the ECMs on the secure key distribution network 104 and selectively selects the unique keys in the ECMs to access watercrypted content from content server 103, as described in further detail below.

In the embodiment of FIG. 1, content server 103 is shown to communicate with a single client 106, however, content server 103 may communicate with any number of clients connected to content distribution network 102. In one embodiment, content distribution network 102 is the Internet. The Internet is a worldwide system of interconnected networks that runs the Internet Protocol (IP) to transfer data (e.g., packets). In other embodiments, network 102 can be other types of networks such as, for example, a token ring network, local area network (LAN), or a wide area network (WAN). Network 102 can also be implemented in a wired or wireless environment. Network 102 can also be implemented using a known Moving Picture Experts Group (MPEG-2) digital video distribution network.

Secure key distribution network 104 is shown as a separate network restricted to content server 103 and client 106. For example, content server 103 may connect with client 106 via a modem connection. Client 106 may use a secure device 120, such a smart card, to allow for secured communication with content server 103. In other embodiments, secure key distribution network 104 may be a subnetwork within content distribution network 102. Secure key distribution network 104 is used to deliver securely ECMs to client 106.

Content server 103 embodies a general-purpose computer such as a web server. Content server 103 may also embody a network device such as a network router, switch, bridge, gateway, or other like network device to perform the operations described herein. Content server 103 includes a watercrypt encoder 101 to receive, e.g., compressed audio/video data, and to watercrypt the data into duplicated watercrypted content for distribution to client 106 on content distribution network 102. Watercrypt encoder 101 also generates ECMs to deliver keys (for accessing the watercrypted content) to client 106 on the secure key distribution network 104. Such processes for content server 103 will be described in further detail below.

In one embodiment, watercrypt encoder 101 is a programmable hardware and/or software module to perform the watercrypting and secure key distribution operations described herein. For example, watercrypt encoder 101 may be a programmable software module executed by a processor within content server 103 to perform operations such as watercrypting and ECM generation and distribution. Alternatively, watercrypt encoder 101 may be programmable hardware such as a field programmable gate array (FPGA) device that is programmed to perform the same operations.

Watercrypt encoder 101 may receive compressed audio/video in varying standards such as Moving Picture Experts Group (MPEG), digital video broadcast (DVB), or other like standards. The compressed audio/video may be stored in transport storage 112. Transport storage 112 may include storage devices such as a hard disk, compact disk (CD), digital video disc (DVD), a random access memory (RAM), a dynamic random access memory (DRAM), or other like memory devices contained in or coupled to content server 103.

Client 106 embodies a general-purpose computer for receiving watercrypted content from content server 103 via content distribution network 102. Client 106 also receives ECMs from content server 103 on secure key distribution network 104. Alternatively, client 106 may be another content server such as content server 103. For example, client 106 may embody a personal computer, workstation, laptop computer, or other like computing devices. Client 106 may also embody an electronic portable devices such as a personal data assistant (PDA), wireless telephone, or other like devices, which can communicate with content distribution network 102 over a wired or wireless medium.

Client 106 includes a watercrypt decoder 111 to receive watercrypted content and corresponding content keys in ECMs from content server 103. Client 106 also includes a secure device 120, for example a smart card device, to communicate with the watercrypt decoder 111. The secure device 120 further provides selected session content keys to the watercrypt decoder 111 to allow the decoder 111 to access or decrypt watercrypted content received from content server 103, as described in further detail below. Client 106 further includes applications to view and display the decrypted watercrypted content from content server 103. For example, client 106 may use an application such as, for example, Real Player™ or QuickTime™ to play back the decrypted watercrypted content.

In one embodiment, watercrypt encoder 101 duplicates a certain subset of compressed audio/video data and watermarks the duplicated content with a first watermark identifier and second watermark identifier. The duplicated content is then encrypted with unique content keys.

For example, a certain segment of content is duplicated with a first watermark identifier and a second watermark identifier. In one embodiment, a first watermark identifier refers to a "1" and a second watermark identifier refers to a "0". The watermark identifiers, however, may refer to any number of different combinations of "1s" or "0s" or alphanumeric symbols.

Figure 2:
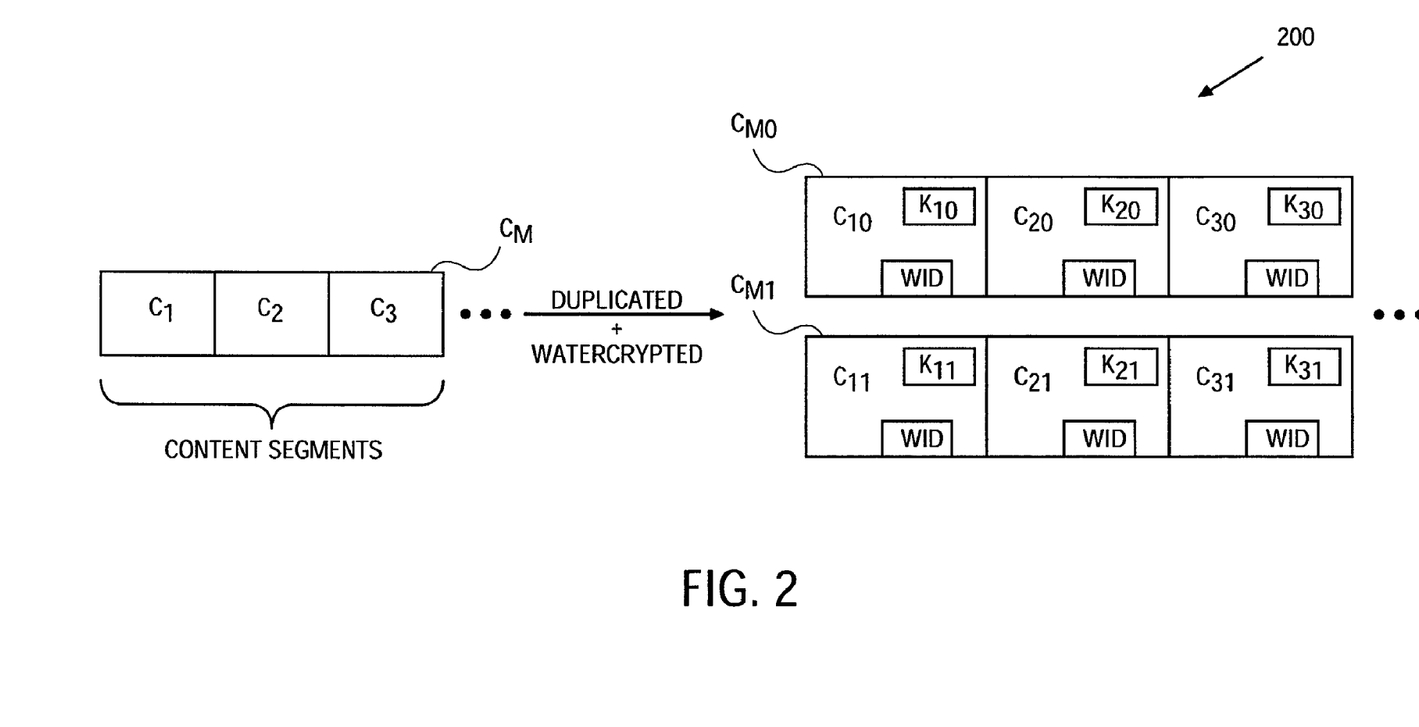
FIG. 2 is a block diagram of one embodiment of duplicated and watercrypted content within the watercrypting environment.

As illustrated in FIG. 2, which is a block diagram of one embodiment of duplicated and watercrypted content within the watercrypting environment, each copy is encrypted with a different content segment encryption key $K_{m0}$ and $K_{m1}$. For example, watercrypt encoder 101 encrypts the duplicated content $C_{M0}$ and $C_{M1}$ with different segment or time-varying content keys $K_{m0}$ and $K_{m1}$, respectively. The following labels refer to the different segments of content and corresponding keys to encrypt the segments as shown in diagram 200 of FIG. 2:

$c_m$: clear content for period m, before watermarking and encryption;
$c_{m0}$: content for period m, watermarked with 0;
$c_{m1}$: content for period m, watermarked with 1;
$k_{m0}$: key used to encrypt content for period m, watermarked with 0; and
$k_{m1}$: key used to encrypt content for period m, watermarked with 1.

The content period "m" may also refer to an identifier to the particular segment of content. The watercrypting process performed by watercrypt encoder 101 can be defined by a watercryption process (Q) including a watermarking (W) process and an encryption (E) process. With respect to watercrypted content of FIG. 2, watercrypt encoder 101 performs an operation or process defined by Equation 1:

$$Q(c_m) = E(k_{m0}, W_0(c_m)) + E(k_{m1}, W_1(c_m)) \quad \text{Equation 1}$$

In Equation 1, the encryption process (E) may use any arbitrary or standard encryption algorithm and the watermarking process (W) may also use any arbitrary or standard watermarking algorithm.

Subsequent to the watercrypting process, the entitlement control messages (ECMs) are generated for client 106 based on a client identifier, for example a watermark ID (WID) for client 106, and based on a segment number for each segment of the duplicated content. Also, watercrypt encoder 101 encrypts the individual content keys using a content identifier to create the ECMs, for example a product key "p." The ECMs are constructed as defined by Equation 2 below:

$$m + d + E_p(K_{m0} + K_{m1}) + \text{Signature}_p(m + d + E_p(K_{m0} + K_{m1})) \quad \text{Equation 2}$$

In Equation 2, "d" represents an arbitrary access criteria data that is signed along with the ECM and "m" represents the period/content segment number or identifier. In one embodiment, m is a cyclic value between 0 and n, e.g., (0, 1, 2, ..., n−1). The value of n determines the number of unique watermarks or fingerprints that can be generated, which is $2^n$ in case of a binary watermark ('0' or '1'). For example, n=16 provides for a maximum of 65536 unique fingerprints.

Thus, watercrypt encoder 101 may sign the entire message with the product key "p". This allows another secure device, such as client 106, holding the same product key to verify securely which keys are intended for which content segments/watermark based on the value of m, which is included in the ECM.

As will be explained in further detail below, content server 103 may therefore be able to provide selectively content keys to client 106 or other clients on the basis of the value of m and the intended watermark identification information "WID". The WID may simply be a number assigned to the secure device 120, e.g., a smart card address for the client 106 or a number assigned to a transaction, e.g., a transaction ID, which in turn may identify a secure device and, thus, the subscriber or client.

In one embodiment, watercrypt encoder 101 can send duplicated content $C_{M0}$ and $C_{M1}$, as shown in FIG. 2, to client 106 via content distribution network 102. Each segment of the duplicated content is encrypted with the unique content keys $K_{m0}$ and $K_{m1}$. The watercrypt encoder 101 can further distribute the ECMs to client 106 over the secure key distribution network 104.

In one embodiment, both content server 103 and client 106 include a key selection process such that content server 103 can selectively distribute ECMs with a particular WID and segment number or client 106 can selectively select ECMs with the particular WID and segment number as will be described below.

In one embodiment, a simple algorithm may be used based on the segment number "m" and the watermark identification information "WID." For example, a key selection process as defined by Equation 3 may be used:

$$\text{KeySelector}(m) = wid[m\%1] \quad \text{Equation 3}$$

In Equation 3, "1" is the length wid and "%" represents the "mod" operation. In addition, m is a cyclic value between 0 and n and m is a multiple of 1. For example, assuming n=256, wid='01100110' and I=8:

KeySelector(0)=0
KeySelector(1)=1
KeySelector(2)=1
. . .
KeySelector(8)=0
KeySelector(9)=1
. . .

Referring back to FIG. 2, using the above key selection process, the duplicated content for segment "0" would require decrypting the corresponding segment of watercrypted content watermarked with "0" using the corresponding encryption key. Thus, using the above key selection process, the keys used by client 106 can be predetermined. Furthermore, content server 103 may also include the same key selection process to distribute selectively those ECMs having those corresponding decryption keys.

In the example of FIG. 1, the key selection process yields a key selection of "1011" such that client 106 selects those decryption keys for corresponding content watermarked with "1011". In one embodiment, content server 103 may broadcast ECMs on secure key distribution network 104. Thus, without using a correct key selection process as described above, a client connected to secure key distribution network 104 will not be able to select the correct ECMs and thus correct decryption keys.

Figure 3:
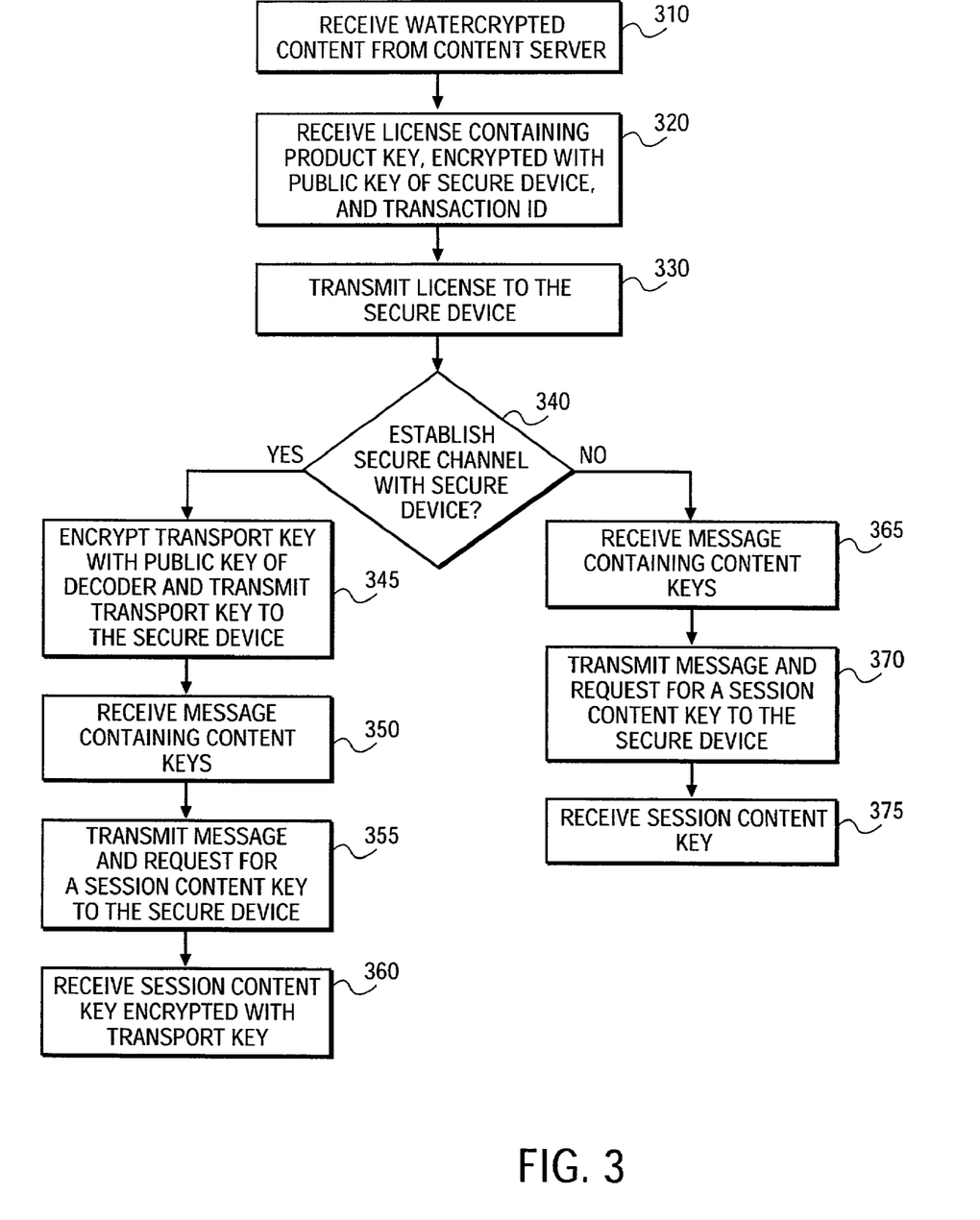
FIG. 3 is a flow diagram of one embodiment of a method to provide secure key selection using a secure device in a watercrypting environment.

FIG. 3 is a flow diagram of one embodiment of a method to provide secure key selection using a secure device in a watercrypting environment. As shown in FIG. 3, at processing block 310, the watercrypt decoder 111 within the client 106 receives the watercrypted content from the watercrypt encoder 101 within the content server 103 via the content distribution network 102.

At processing block 320, the watercrypt decoder 111 within the client 106 receives a license containing the transaction ID or "WID" and the product key "p" encrypted with a public key of the secure device 120 via the secure key distribution network 104. In one embodiment, the watercrypt encoder 101 encrypts the product key "p" with the public key of the secure device 120 and appends the WID to create the license. Alternatively, the watercrypt encoder 101 may encrypt the product key "p" with a private or secret key of the secure device 120. In yet another alternate embodiment, the license may be created by another entity, for example an agent connected to the secure key distribution network 104 and configured to receive the license information from the content server 103 and to encrypt the product key with the public key of the secure device.

At processing block 330, the watercrypt decoder 111 transmits the license to the secure device 120. The secure device 120 stores the license and secures access to the product key "p," which was previously encrypted with the public key of the secure device 120.

At processing block 340, a decision is made by the watercrypt decoder 111 whether to establish a secure channel with the secure device 120. The secure channel allows the secure transmission of communications between the decoder 111 and the secure device 120.

If the decoder 111 decides to establish the secure channel, at processing block 345, a transport key is encrypted with the public key of the decoder 111. The decoder 111 subsequently transmits the transport key to the secure device 120. At processing block 350, the decoder 111 receives a message containing the unique content keys corresponding to the watercrypted content. In one embodiment, the message is an ECM transmitted via the secure key distribution network 104. At processing block 355, the decoder 111 transmits the message to the secure device 120. At the same time, the watercrypt decoder 111 transmits a request for a session content key to be used to decrypt the watercrypted content, e.g. one of the content keys $K_{m0}$ or $K_{m1}$. Finally, at processing block 360, the decoder 111 receives the session content key encrypted with the transport key from the secure device 120 and proceeds to decrypt the watercrypted content.

If the decoder 111 decides not to establish the secure channel, at processing block 365, the decoder 111 receives a message containing the unique content keys corresponding to the watercrypted content. In one embodiment, the message is the ECM transmitted via the secure key distribution network 104, which contains the content keys $K_{m0}$ and $K_{m1}$. At processing block 370, the decoder 111 transmits the message to the secure device 120. At the same time, the watercrypt decoder 111 transmits the request for the session content key to be used to decrypt the watercrypted content. Finally, at processing block 375, the decoder 111 receives the session content key from the secure device 120 and proceeds to decrypt the watercrypted content.

Figure 4:
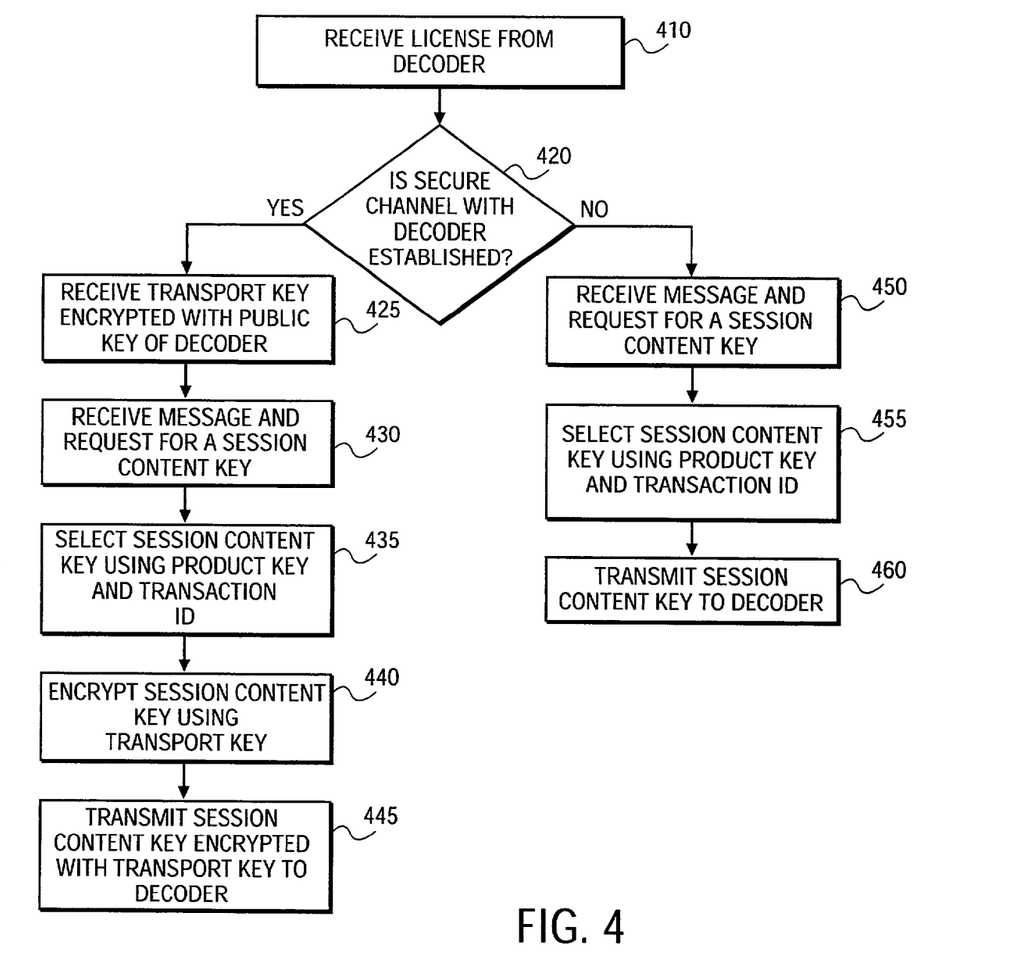
FIG. 4 is a flow diagram of another embodiment of the method to provide secure key selection using a secure device in a watercrypting environment.

FIG. 4 is a flow diagram of another embodiment of the method to provide secure key selection using a secure device in a watercrypting environment. As shown in FIG. 4, at processing block 410, the secure device 120 receives the license from the watercrypt decoder 111. In one embodiment, the license contains the transaction ID or "WID" and the product key "p" encrypted with the public key of the secure device 120.

At processing block 420, a decision is made whether a secure channel between the secure device 120 and the decoder 111 needs to be established. In one embodiment, the decoder 111 decides whether to establish the secure channel with the secure device 120.

If the secure channel is established, at processing block 425, the secure device 120 receives the transport key encrypted with the public key of the decoder 111. At processing block 430, the secure device 120 receives a message containing the unique content keys corresponding to the watercrypted content from the watercrypt decoder 111. In one embodiment, the message is an ECM transmitted via the secure key distribution network 104. At the same time, the secure device 120 receives a request for the session content key to be used to decrypt the watercrypted content, e.g. one of the content keys $K_{m0}$ or $K_{m1}$. At processing block 435, the secure device 120 selects the session content key using the product key "p" and the WID received in the license. At processing block 440, the secure device encrypts the session content key using the transport key of the secure channel. Finally, at processing block 445, the secure device 120 transmits the session content key encrypted with the transport key to the decoder 111.

If the secure channel is not established, at processing block 450, the secure device 120 receives the message containing the unique content keys corresponding to the watercrypted content from the watercrypt decoder 111. At the same time, the secure device 120 receives the request for the session content key to be used to decrypt the watercrypted content, e.g. one of the content keys $K_{m0}$ or $K_{m1}$. At processing block 455, the secure device 120 selects the session content key using the product key "p" and the WID received in the license. Finally, at processing block 460, the secure device 120 transmits the session content key to the watercrypt decoder 111.

Figure 5:
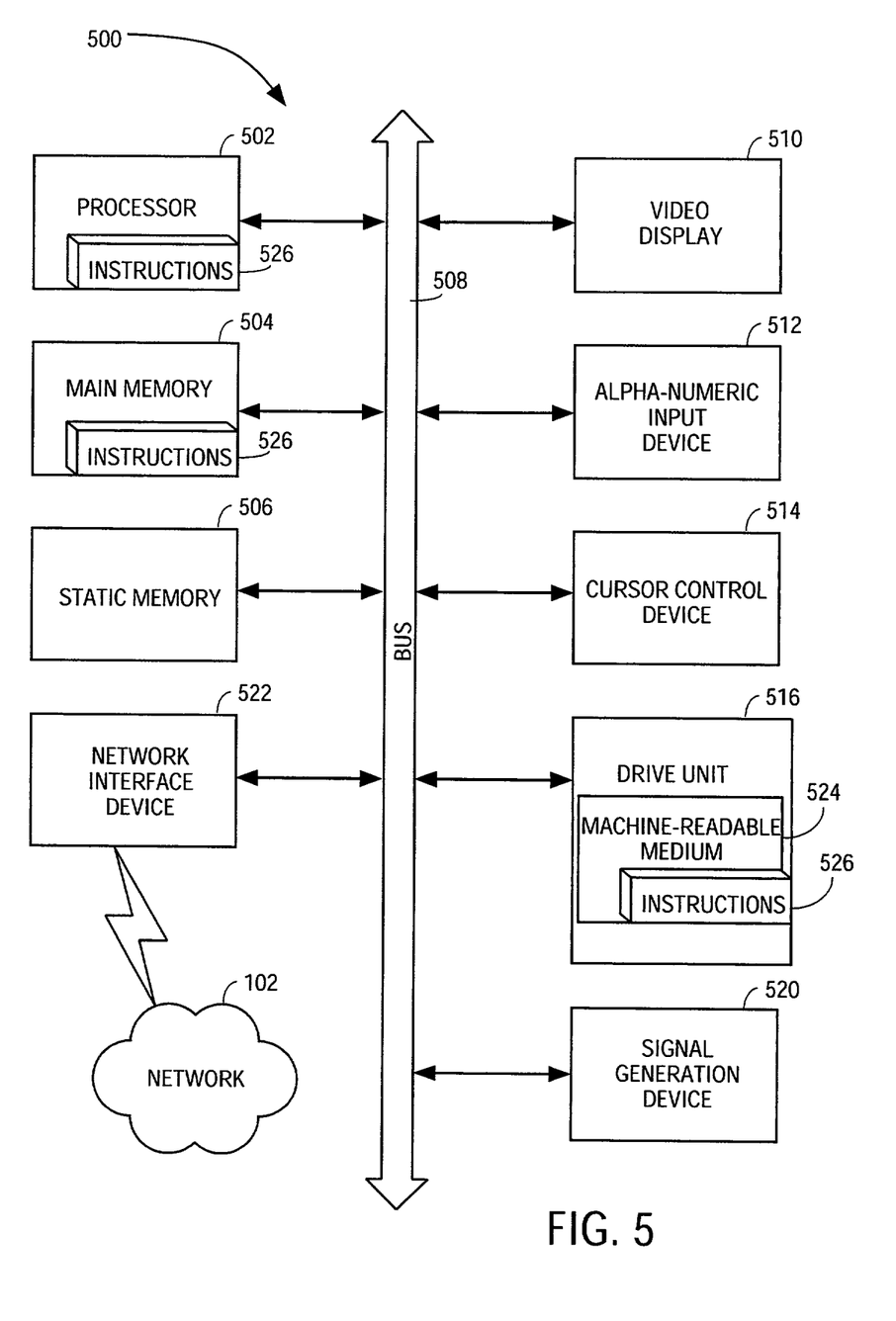
FIG. 5 is a block diagram of an exemplary digital processing or computing system in which the present invention can be implemented.

FIG. 5 is a block diagram of an exemplary digital processing system 500 for a content server or a client. For example, digital processing system 500 can represent content server 103 or client 106 as described in FIG. 1. Digital processing system 500 may store a set of instructions for causing the system to perform any of the operations as explained above. Digital processing system 500 can also represent a network device, which includes a network router, switch, bridge, or gateway. Digital processing system 500 can also represent a client as a portable electronic device such as, for example, a personal data assistant, a mobile device, a web appliance, or any other type of machine capable of executing a sequence of instructions that specify actions to be taken by that device.

Referring to FIG. 5, digital processing system 500 includes a bus 508 coupled to a central processing unit (CPU) 502, main memory 504, static memory 506, network interface 522, video display 510, alpha-numeric input device 512, cursor control device 514, drive unit 516, and signal generation device 520. The devices coupled to bus 508 can use bus 508 to communicate information or data to each other. Furthermore, the devices of digital processing system 500 are exemplary in which one or more devices can be omitted or added. For example, one or more memory devices can be used for digital processing system 500.

The CPU 502 can process instructions 526 or instructions 526 stored in main memory 504 or a machine-readable medium 524 within drive unit 516 via bus 508. For one embodiment, CPU 502 can process and execute instructions 526 to implement the operations described above. Bus 508 is a communication medium for communicating data or information for digital processing system 500.

Main memory 504 can be, e.g., a random access memory (RAM) or some other dynamic storage device. Main memory 504 stores instructions 526, which can be used by CPU 502. Main memory 504 may also store temporary variables or other intermediate information during execution of instructions by CPU 502. Static memory 506, can be, e.g., a read only memory (ROM) and/or other static storage devices, for storing information or instructions, which can also be used by CPU 502. Drive unit 516 can be, e.g., a hard or floppy disk drive unit or optical disk drive unit, having a machine-readable medium 524 storing instructions 526. The machine-readable medium 524 can also store other types of information or data.

Video display 510 can be, e.g., a cathode ray tube (CRT) or liquid crystal display (LCD). Video display device 510 displays information or graphics to a user. Alpha-numeric input device 512 is an input device (e.g., a keyboard) for communicating information and command selections to digital processing system 500. Cursor control device 514 can be, e.g., a mouse, a trackball, or cursor direction keys, for controlling movement of an object on video display 510. Signal generation device 520 can be, e.g., a speaker or a microphone.

Digital processing system 500 can be connected to a network 102 via a network interface device 522. Network interface 522 can connect to a network such as, for example, a local area network (LAN), wide area network (WAN), token ring network, Internet, or other like networks. Network interface device 522 can also support varying network protocols such as, for example, hypertext transfer protocol (HTTP), asynchronous transfer mode (ATM), fiber distributed data interface (FDDI), frame relay, or other like protocols.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

Thus, a method and system to provide secure key selection in a watercrypting environment using a secure device have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computerized method to provide secure key selection comprising:
   transmitting a license from a server to a secure device for storage, the license containing a product key of a watercrypted content and a client identifier;
   transmitting via an electronic network an entitlement control message containing a plurality of content keys associated with said watercrypted content to said secure device;
   transmitting a request to provide a session content key from said plurality of content keys, said session content key encrypted at said secure device using a transport key encrypted with a public key associated with said server, and said session content key being used to decrypt said watercrypted content; and
   receiving said session content key from said secure device in response to said request.

2. The method according to claim 1, wherein said license is encrypted with a public key of said secure device to allow said secure device to access said license.

3. The method according to claim 1, wherein said license is encrypted with a secret key of said secure device to allow said secure device to access said license.

4. The method according to claim 1, further comprising:
   establishing a secure channel to communicate securely with said secure device.

5. The method according to claim 4, wherein said establishing further comprises:
   encrypting said transport key with a personal public key; and
   transmitting said transport key to said secure device.

6. The method according to claim 5, wherein said receiving further comprises:
   receiving said session content key encrypted with said transport key; and
   decrypting said session content key to be used in decrypting said watercrypted content.

7. The method according to claim 1, wherein said secure device is a smart card device.

8. The method according to claim 1, further comprising receiving said license from a content server which distributed said watercrypted content.

9. The method according to claim 1, further comprising receiving said license from an entity connected to a content server which distributed said watercrypted content, said entity storing said client identifier and being configured to encrypt said product key with a public key of said secure device.

10. The method according to claim 1, further comprising receiving said entitlement control message from a content server which distributed said watercrypted content.

11. A computerized method to provide secure key selection comprising:
    electronically storing a license containing a product key of a watercrypted content and a client identifier from a decoder;
    receiving via an electronic network an entitlement control message containing a plurality of content keys associated with said watercrypted content from said decoder;
    receiving a request to provide a session content key from said plurality of content keys, said session content key to be used to decrypt said watercrypted content;
    selecting said session content key using said product key and said client identifier from said license;
    receiving a transport key encrypted with a public key of said decoder;
    encrypting said session content key with said transport key; and
    transmitting said session content key to said decoder in response to said request.

12. The method according to claim 11, wherein said license is encrypted with a personal public key to allow access to said license.

13. The method according to claim 12, further comprising decrypting said license using said personal public key.

14. The method according to claim 4, wherein said transmitting further comprises transmitting said session content key encrypted with said transport key to said decoder.

15. Electronic apparatus to provide secure key selection comprising:
    means for transmitting a license from a server to a secure device for storage, the license containing a product key of a watercrypted content and a client;
    means for transmitting via an electronic network an entitlement control message containing a plurality of content keys associated with said watercrypted content to said secure device;
    means for transmitting a request to provide a session content key from said plurality of content keys, said session content key encrypted at said secure device using a transport key encrypted with a public key associated with said server, and said session content key being used to decrypt said watercrypted content; and
    means for receiving said session content key from said secure device in response to said request.

16. The apparatus according to claim 15, wherein said license is encrypted with a public key of said secure device to allow said secure device to access said license.

17. The apparatus according to claim 15, wherein said license is encrypted with a secret key of said secure device to allow said secure device to access said license.

18. The apparatus according to claim 15, further comprising:
    means for establishing a secure channel to communicate securely with said secure device.

19. The apparatus according to claim 18, further comprising:
    means for encrypting a transport key with a personal public key; and means for transmitting said transport key to said secure device.

20. The apparatus according to claim 19, further comprising:
means for receiving said session content key encrypted with said transport key; and
means for decrypting said session content key to be used in decrypting said watercrypted content.

21. The apparatus according to claim 15, wherein said secure device is a smart card device.

22. The apparatus according to claim 15, further comprising means for receiving said license from a content server which distributed said watercrypted content.

23. The apparatus according to claim 15, further comprising means for receiving said license from an entity connected to a content server which distributed said watercrypted content, said entity storing said client identifier and being configured to encrypt said product key with a public key of said secure device.

24. The apparatus according to claim 15, further comprising means for receiving said entitlement control message from a content server which distributed said watercrypted content.

25. Electronic apparatus to provide secure key selection comprising:
means for electronically storing a license containing a product key of a watercrypted content and a client identifier from a decoder;
means for receiving via an electronic network an entitlement control message containing a plurality of content keys associated with said watercrypted content from said decoder;
means for receiving a request to provide a session content key from said plurality of content keys, said session content key to be used to decrypt said watercrypted content;
means for selecting said session content key using said product key and said client identifier from said license;
means for receiving a transport key encrypted with a public key of said decoder;
means for encrypting said session content key with said transport key; and
means for transmitting said session content key to said decoder in response to said request.

26. The apparatus according to claim 25, wherein said license is encrypted with a personal public key to allow access to said license.

27. The apparatus according to claim 26, further comprising means for decrypting said license using said personal public key.

28. The apparatus according to claim 4, further comprising means for transmitting said session content key encrypted with said transport key to said decoder.

29. A computer readable medium containing executable instructions, which, when executed in a processing system, cause said processing system to perform a method to provide secure key selection comprising:
transmitting a license from a server to a secure device for storage, the license containing a product key of a watercrypted content and a client identifier;
transmitting via an electronic network an entitlement control message containing a plurality of content keys associated with said watercrypted content to said secure device;
receiving a request to provide a session content key from said plurality of content keys, said session content key encrypted at said secure device using a transport key encrypted with a public key associated with said server, and said session content key being used to decrypt said watercrypted content; and
receiving said session content key from said secure device in response to said request.

30. A computer readable medium containing executable instructions, which, when executed in a processing system, cause said processing system to perform a method to provide secure key selection comprising:
electronically storing a license containing a product key of a watercrypted content and a client identifier from a decoder;
receiving via an electronic network an entitlement control message containing a plurality of content keys associated with said watercrypted content from said decoder;
receiving a request to provide a session content key from said plurality of content keys, said session content key to be used to decrypt said watercrypted content;
selecting said session content key using said product key and said client identifier from said license;
receiving a transport key encrypted with a public key of said decoder;
encrypting said session content key with said transport key; and
transmitting said session content key to said decoder in response to said request.

31. Electronic apparatus to provide secure key selection comprising:
a decoder; and
a secure device coupled to said decoder to store a license sent from said decoder, said license containing a product key of a watercrypted content and a client identifier, to receive via an electronic network an entitlement control message containing a plurality of content keys associated with said watercrypted content from said decoder and to receive a request to provide a session content key from said plurality of content keys, said secure device further receives a transport key encrypted with a decoder public key of said decoder and encrypts said session content key with said transport key, said session content key used to decrypt said watercrypted content, to select said session content key using said product key and said client identifier from said license, and to transmit said session content key to said decoder in response to said request.

32. The apparatus according to claim 31, wherein said license is encrypted with a public key of said secure device to allow said secure device to access said license.

33. The apparatus according to claim 31, wherein said license is encrypted with a secret key of said secure device to allow said secure device to access said license.

34. The apparatus according to claim 31, wherein said decoder further establishes a secure channel to communicate securely with said secure device.

35. The apparatus according to claim 34, wherein, in establishing said secure channel, said decoder further encrypts a transport key with a decoder public key and transmits said transport key to said secure device.

36. The apparatus according to claim 35, wherein said decoder further receives said session content key encrypted with said transport key and decrypts said session content key to be used in decrypting said watercrypted content.

37. The apparatus according to claim 31, wherein said secure device is a smart card device.

38. The apparatus according to claim 31, wherein said decoder further receives said license from a content server, which distributed said watercrypted content.

39. The apparatus according to claim 31, wherein said decoder further receives said license from an entity connected to a content server which distributed said watercrypted content, said entity storing said client identifier and being configured to encrypt said product key with a public key of said secure device.

40. The apparatus according to claim 31, wherein said decoder further receives said entitlement control message from a content server, which distributed said watercrypted content.

41. The apparatus according to claim 32, wherein said secure device further decrypts said license using said public key.

42. The apparatus according to claim 4, wherein said secure device further transmits said session content key encrypted with said transport key to said decoder.

* * * * *